United States Patent
Wright et al.

[11] Patent Number: 6,161,066
[45] Date of Patent: Dec. 12, 2000

[54] ADVANCED LAW ENFORCEMENT AND RESPONSE TECHNOLOGY

[75] Inventors: George B. Wright; Joseph Morgan; John Witz, all of College Station, Tex.

[73] Assignee: The Texas A&M University System, College Station, Tex.

[21] Appl. No.: 09/283,348

[22] Filed: Mar. 31, 1999

Related U.S. Application Data

[63] Continuation-in-part of application No. 08/912,676, Aug. 18, 1997.

[51] Int. Cl.[7] .................................. B60Q 1/26; G06F 7/00
[52] U.S. Cl. ............................ 701/36; 348/118; 340/468; 340/472; 340/937; 340/815.4
[58] Field of Search ................ 701/35, 36; 340/425.5, 340/468, 472, 815.4, 815.68, 937; 348/118

[56] References Cited

U.S. PATENT DOCUMENTS

| | | | |
|---|---|---|---|
| 4,232,390 | 11/1980 | McEvilly, Jr. | 455/77 |
| 4,392,187 | 7/1983 | Bornhorst | 362/233 |
| 4,396,977 | 8/1983 | Slater et al. | 364/188 |
| 4,479,197 | 10/1984 | Haag et al. | 364/900 |
| 4,769,762 | 9/1988 | Tsujido | 364/521 |
| 4,818,010 | 4/1989 | Dillon | 296/37.7 |
| 4,829,294 | 5/1989 | Iwami et al. | 340/723 |
| 4,833,592 | 5/1989 | Yamanaka | 364/138 |
| 4,980,837 | 12/1990 | Nunn et al. | 364/484 |
| 5,006,002 | 4/1991 | Brodbeck | 400/613.2 |
| 5,140,304 | 8/1992 | Miller | 340/472 |
| 5,154,617 | 10/1992 | Suman et al. | 439/34 |
| 5,212,628 | 5/1993 | Bradbury | 361/395 |
| 5,226,540 | 7/1993 | Bradbury | 206/576 |
| 5,263,118 | 11/1993 | Cornelison | 395/2 |
| 5,296,840 | 3/1994 | Geiffers | 340/474 |
| 5,379,057 | 1/1995 | Clough et al. | 345/173 |
| 5,404,443 | 4/1995 | Hirata | 395/161 |
| 5,408,330 | 4/1995 | Squicciarini et al. | 358/335 |
| 5,442,512 | 8/1995 | Bradbury | 361/683 |
| 5,461,560 | 10/1995 | Uribe | 364/188 |
| 5,463,227 | 10/1995 | Stern et al. | 250/559.29 |
| 5,515,042 | 5/1996 | Nelson | 340/937 |
| 5,515,267 | 5/1996 | Alsenz | 364/188 |
| 5,555,502 | 9/1996 | Opel | 701/36 |
| 5,573,300 | 11/1996 | Simmons | 296/197 |
| 5,590,022 | 12/1996 | Harvey | 361/683 |

FOREIGN PATENT DOCUMENTS 0577054   5/1994   European Pat. Off. ......... H04N 7/18

*Primary Examiner*—William A. Cuchlinski, Jr.
*Assistant Examiner*—Yonel Beaulieu
*Attorney, Agent, or Firm*—Shawn Hunter; James E. Bradley; Felsman, Bradley, Vaden, Gunter & Dillon, L.L.P.

[57] ABSTRACT

Improvements for an ALERT®-type vehicle-based control system are described. The improvements encompass the use of a multiple control unit architecture for more efficient processing of user interface functions and device commands. The improved architecture allows one control unit to manage the control functions for a first device set. The second, or subsequent, control unit offloads the management of device control functions from the first control unit. Devices and methods are also described for incorporating the control system into a vehicle data bus, such as the IDB.

18 Claims, 5 Drawing Sheets

ADVANCED LAW ENFORCEMENT AND RESPONSE TECHNOLOGY

CROSS-REFERENCE TO RELATED APPLICATIONS

This is a continuation-in-part of co-pending U.S. patent application Ser. No. 08/912,676 filed Aug. 18, 1997 which is incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms, as provided for by the terms of Work Order No. DTFH71-94-TE037-TX-29 awarded by the U.S. Department of Transportation, Federal Highway Administration.

BACKGROUND OF THE INVENTION

1. Field of the Invention

The present invention relates generally to improved devices and methods for controlling vehicle peripheral devices and subsystems, such as sirens, light bars, radar systems and so forth. Further, the invention relates to an emergency response system for rapidly coordinating and controlling the operation of numerous emergency vehicle peripheral subsystems. In other aspects, the invention relates to devices and methods for transmitting and relaying data, such as information and messages, remotely to, through and from an emergency vehicle.

2. Description of the Related Art

Related U.S. patent application Ser. No. 912,676 described devices and methods for control of emergency vehicle peripheral subsystems such as those used in police cars or in ambulances, fire trucks other emergency vehicles. A vehicle-based control system and controller was described. Application Ser. No. 912,676 also described devices and methods for allowing communications and information transmission between a police officer or other emergency worker located outside of the vehicle and the vehicle-based control system via a hand-held unit. Communications and information transmission with a remote communications base were also described.

Devices and methods of this type are currently being commercialized by the Texas Transportation Institute's "ALERT®" program for use in police vehicles, and other emergency vehicles. Although the ALERT® program has been very successful in developing this technology recently, several areas of potential improvement have been identified. There is a desire to reduce the overall cost of the ALERT® intelligent vehicle control system, reduce power consumption, increase the overall computing ability for the system and shrink the physical size of the components used in the ALERT® system. Also, it is desired to expand the capability of the system to control a larger number of peripheral subsystems without the expense associated with acquiring additional serial controller boards that have been needed to associate the peripheral subsystems with the controller.

In addition, it is desired to make ALERT®-type systems interoperable with the Intelligent Transportation System (ITS) data bus (IDB) that has recently been developed by the Society of American Engineers (SAE). The IDB is a non-proprietary token passing bus, designed to allow disparate consumer, vehicle and commercial electronic components to share information across a standard open data bus. The IDB is primarily intended for the consumer vehicle market. However, use in other vehicles is also expected, including trucks and emergency vehicles. At this time, the IDB is being used in a number of prototype and demonstration vehicles and is expected to be in more widespread use within the next few years. Aspects of the IDB are described in SAE publications including J2366-2, ITS Data Bus Link Layer, Draft Recommended Practice (Jun. 22, 1998) and J2366-4, ITS Data Bus Thin Transport Layer, Draft Recommended Practice (Jun. 29, 1998).

The IDB is currently intended to permit associated devices to operate on a peer-to-peer architecture basis, as opposed to a master-slave form of operation which would require a master device to control the operation of a number of "slave" devices. The use of peer-to-peer architecture allows "plug-and-play" operation to occur so that devices can be attached to the bus, or replaced, without having to program or reprogram a master controller.

Hence, a need exists for a control system that is interoperable with the IDB or other vehicle data bus. A need also exists for a control system that is capable of controlling a large number of peripherals without becoming prohibitively expensive and cumbersome.

SUMMARY OF THE INVENTION

The present invention is directed to improvements in an ALERT®-type vehicle-based control system. The improvements encompass the use of a multiple control unit architecture for more efficient processing of user interface functions and device commands. The improved architecture allows one control unit to manage the control functions for a first device set. The second, or subsequent, control unit offloads the management of device control functions from the first control unit. The present invention also describes devices and methods for incorporating the control system into a vehicle data bus, such as the IDB.

In one aspect, the present invention is directed to an improved central control system that affords intuitive and easy control of the numerous subsystems associated with a police car or other emergency vehicle. A touch screen user interface is associated with a device control arrangement having a multiple control unit architecture. Most communications and device control functions are offloaded and performed separately from the graphics-intensive user interface functions.

The multiple control unit architecture permits the large processing requirements inherent in the control of numerous individual devices to be handled by the control units in a timely fashion. Additionally, the control units will not need to utilize expensive high end performance controllers or processors in order to effectively accomplish the necessary tasks.

The multiple control unit architecture of the control arrangement also reduces the rate of data transfer into and out of each of the controllers so that no single portion of the control arrangement has a high power requirement. Accordingly, the control arrangement may be more easily incorporated into a power and data bus, such as the IDB.

In the inventive system, a bus interface is used rather than an intelligent serial controller board to relate the controllers to the peripherals. As a result, a larger number of devices may be associated with the control system without the need to acquire additional controller boards having individual ports for each device.

The architecture and improvements described herein result in a lower cost for the system. They also allow for an increased number of peripheral devices to be associated with and controlled by the system at minimal cost. The improved system eliminates the need for a serial control board as an interface between the controller and the peripheral devices. The serial control boards had a limited number, typically eight, of serial ports available on them. In order to control more than eight peripheral devices, it was necessary to obtain an additional serial control board and utilize an additional board slot in the controller.

Further aspects of the invention feature control of peripheral devices including a vehicle two-way radio, night vision camera and a vehicle automated license identification ("ALID") system.

DETAILED DESCRIPTION OF THE PREFERRED EMBODIMENTS

Figure 1:
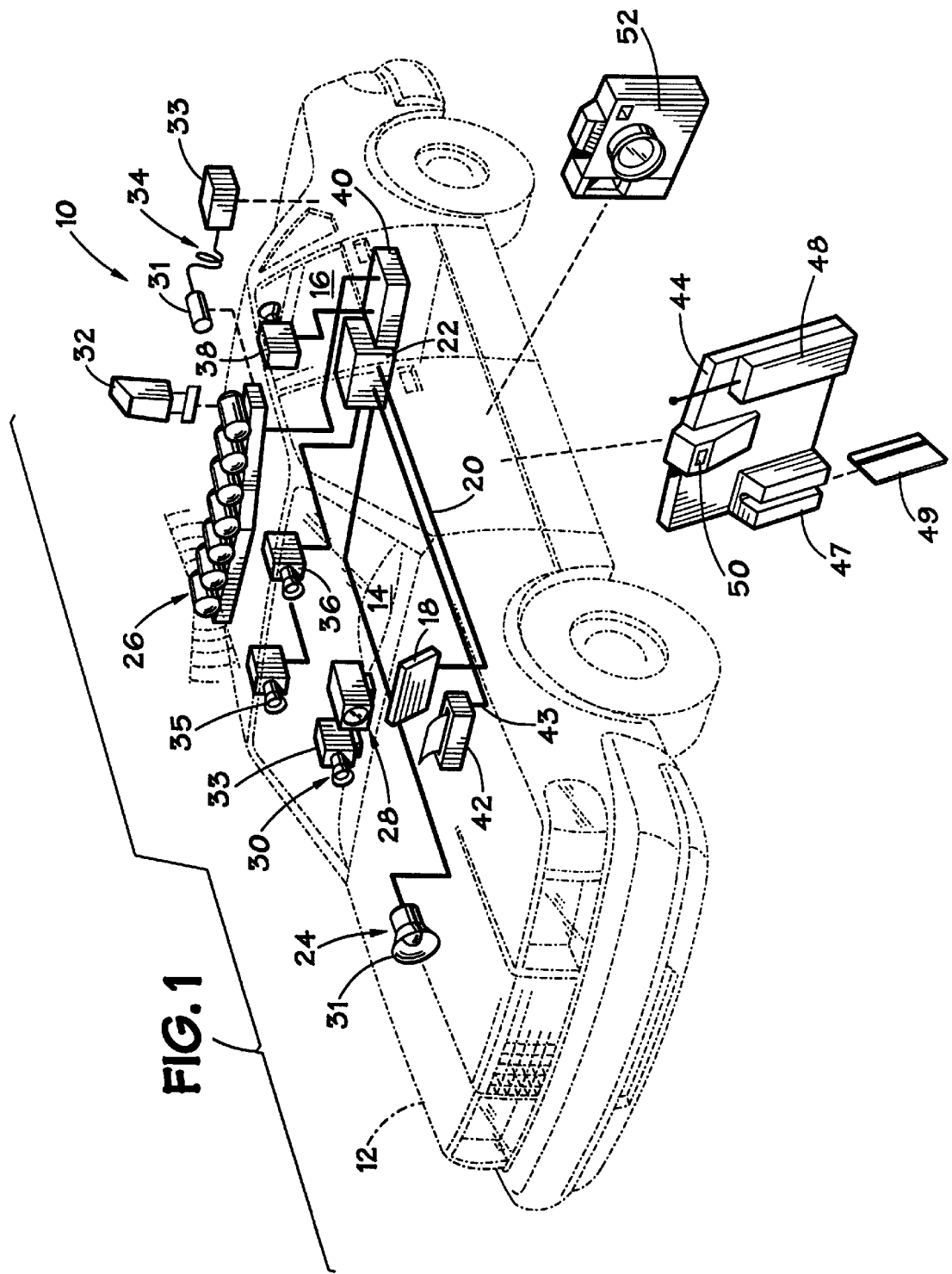
FIG. 1 depicts a physical layout for an exemplary control system constructed in accordance with the present invention incorporated within a police car.

Referring first to FIG. 1, components of an exemplary control system, indicated generally at 10, are shown incorporated within an exemplary police vehicle 12, which is shown in phantom lines. General information concerning the structure and operation of the control system 10 was provided in the related U.S. patent application Ser. No. 912,676 and is incorporated here by reference.

Although the system 10 is described in conjunction with a police vehicle, it should be understood that the invention has application to other vehicles such as ambulances and fire trucks and even private vehicles. Further, the invention may be adapted for use with helicopters, water craft and so forth. As is well known, the vehicle 12 includes a passenger compartment 14 and separate storage compartment, or trunk, 16. A user interface device 18 is mounted within the passenger compartment 14. In the depicted embodiment, the user interface device 18 features a touch-sensitive screen console or "touch screen" (shown in FIG. 2). A preferred touch screen is currently a MobileVu™ touch screen device available from Litton Data Systems of San Diego, Calif.

Other mechanisms may also be employed as user interface devices, including keyboards, or push button keypads with associated monitors, without departing from the scope and spirit of the invention. A touchscreen is currently preferred as a user interface device because it is not particularly bulky, and it readily permits a user to input commands and information while displaying information to the user in an interactive manner by presenting a graphical control panel of controls, as will be described in further detail shortly. It is preferred that the user interface device 18 be mounted proximate the center console of the vehicle 12's dashboard and should not obstruct deployment of either driver or passenger side airbags. Because only a single interface or control device is mounted in the passenger compartment 14 of the vehicle, the passenger compartment 14 is not cluttered with numerous control heads, thereby resulting in a "clean cockpit."

A data cable 20 operably interconnects the user interface device 18 with a central vehicle-based control housing 22 that is mounted within the trunk 16 of the vehicle. The control housing 22 is used to contain components of the control system 10 including, for example, the display computer 60 and, perhaps, the real time microcontroller 64. Each of these components will be described in greater detail shortly.

A number of devices or subsystems, which are referred to as peripheral devices or subsystems here, are interrelated with the police vehicle 12 for use by police officers in performing their duties. Referring again to FIG. 1, the exemplary police vehicle 12 is equipped with a siren subsystem, shown generally at 24; a light bar subsystem, shown generally at 26; a traffic radar subsystem, shown generally at 28; a GPS subsystem (not shown in FIG. 1), and a video camera subsystem, shown generally at 30. Additionally, the exemplary vehicle 12 carries a night vision camera arrangement 32 which is mounted upon the roof of the vehicle 12, and an ALID (automated license identification) system 34 which consists of a roof mounted component 31 and a control unit 33 which is stored in the vehicle trunk 16.

As is well known, each of the peripheral subsystems basically consists of an activated component and a control head (not shown) which is used to control the activated component. The present invention permits the manufacturer's control heads to be removed from these subsystems so that each of the subsystems is capable of being controlled only by the components within the control housing 22. It is presently preferred, however, that the individual control heads for the subsystems be located within the trunk 16 of the vehicle 12 and wired in parallel to the control system housed within housing 22. The advantage to this type of arrangement is that, in the event of a malfunction in the control system or the user interface device 18, the control heads can be relocated into the passenger compartment so that the subsystems can still be operated. Further, certain jurisdictions may require, for example, that an officer's traffic radar readings be taken from a radar system control head which has been properly certified in order for citations to be issued based upon a traffic radar system. Therefore, the ability to reference to the original system control head may be necessary.

The siren subsystem 24 is capable of being selectively operated in a plurality of modes to produce various particular siren sounds. For example, a siren subsystem 24 might be operable in modes including "YELP," "AIR HORN," "WAIL" and so forth, each corresponding to a well-known sound associated with an emergency vehicle siren. Particular siren modes are typically prescribed by individual police department policy for use in particular situations.

The light bar subsystem 26 includes an elongated light bar which is typically mounted perpendicular to the length of the vehicle 12 and includes rows of white, red, blue and/or amber lights which are capable of being flashed and rotated in accordance with pre-programmed patterns. Particular programmed patterns are typically prescribed by individual department policy for use in particular situations. Further general descriptions concerning operation of light bar and siren systems are found in U.S. Pat. No. 5,140,304 entitled "Siren Sound Synchronized Light Bar System," issued to Miller and U.S. Pat. No. 4,980,837 entitled "Circuit and Method for Automatically Sweeping Through a Plurality of Siren Modes" issued to Nunn et al. Currently, many siren subsystems and light bar subsystems are marketed as a single unit. An example of an apparatus suitable for use as the siren subsystem 24 and the light bar subsystem 26 is the Premium Vision® Warning System marketed by Signalvations Corporation of 18506 South 81st Avenue, Tinley Park, Ill. 60477.

The traffic radar subsystem 28 is of the type currently made and marketed by Kustom Signals, Inc. of 9325 Pflumm Road, Lenexa, Kans. 66215-3347 or Applied Concepts, 730 F Avenue, Suite 200, Plano, Tex. 75074. As is well known, radar subsystems of this type are capable of detecting and recording the speeds of vehicles travelling on a roadway. The radar subsystem 28 is capable of being operated in a plurality of different modes. For example, radar subsystem 28 could be selectively switched between tracking of vehicle speeds for vehicles which are located generally in front of the police vehicle 12 or, alternatively, tracking the speeds of those located to the rear of the police vehicle 12.

The video camera subsystem 30 includes a frame grabber assembly (71 in FIG. 2) which is capable of selecting, displaying and transmitting a still image from one of several cameras. A frame grabber assembly suitable for this application is marketed by ImageNation™, P.O. Box 276, Beaverton, Oreg. 97075-0276. In the preferred embodiments described here, the video camera subsystem 30 includes four cameras 33, 35, 36 and 38. As is apparent from FIG. 1, one camera 33 is pointed so as to be able to capture the field of view immediately in front of the police vehicle 12. Two of the cameras 35, 36 are aimed so that they can cover the fields of view to the right front and left front of the vehicle 12, respectively. The fourth camera 38 is aimed rearwardly so that video of the area behind the vehicle 12 may be captured. Alternatively, this fourth camera 38 may be mounted so that it will capture the back seat area of the vehicle 12. The four cameras 33, 35, 36 and 38 are operationally interconnected through a multiplexer (not shown) which makes up part of the frame grabber assembly 71 and permits one of the four cameras 33, 35, 36 or 38 to be selected for individual control as a "primary camera." A VCR (video cassette recorder) 40, which is also a part of the video camera subsystem 30, is located in the trunk 16 and operably connected so as to record images photographed by one or more of the cameras 33, 35, 36, 38. In practice, one of the cameras, 33, 35, 36 or 38 becomes the "primary camera" while the other three cameras are "secondary cameras." The images captured by each of these cameras is transmitted for display upon the touch sensitive surface 19 of the touch screen 18. The camera which is the primary camera can be controlled by the operator to be panned and scanned, focussed, zoomed in or out, and so forth. The secondary cameras are not typically controlled in this manner.

The night vision camera arrangement 32 is useful for obtaining photographic images in low light environments and transmitting these images for display upon the touch sensitive surface 19 of the touch screen 18. A currently preferred device of this nature is the Texas Instruments NIGHTSIGHT® night vision system. The night vision camera arrangement 32 is also multiplexed with the VCR 40 and cameras 32, 34, 36 and 38.

The ALID system 34 is useful to obtain an infrared image of a vehicle license plate and, via character-recognition software, decipher the alphanumeric characters imprinted in the license plate. A suitable system for use in this capacity is commercially available from Racal Messenger, Inc. of Sunrise, Fla.

A printer 42 is mounted in the passenger compartment 14 of the vehicle 12 and is interconnected by a printer cable 43 to the display computer 60 in the control housing 22.

FIG. 1 also depicts a pen-based portable computer, or hand held unit (HHU) 44, which is associated with the vehicle 12 so that data and information can be transmitted between the two. The HHU 44 includes a touch-sensitive screen surface (not shown) just as touch screen device 18 does. The HHU also contains internal memory or information storage media so that information which is entered into the HHU 44 will be stored therein. Data may be entered into the HHU 44 by selecting or "writing" information upon the touch screen surface with an electronic "pen" or "stylus" in a manner known in the art. Currently available pen-based computers preferred for use in this application include the Fujitsu Stylus 1200 model.

A wireless LAN adapter 48 (visible in FIG. 1) is affixed and operably interconnected with the HHU 44 for transmission of data entered into the HHU 44 to the central controller 22 in the vehicle 12. Currently, a suitable LAN adapter for this application is the Range LAN 2 7200 available from Proxim, Inc., 295 N. Bernardo Avenue, Mountain View, Calif. 94043. The Range LAN 2 7200 is a wireless LAN adapter having a PCMCIA type II card interface by which it can be operatively interconnected with the HHU 44. This type of LAN adapter is capable of transmission and receipt of digital information over a relatively small distance, perhaps a radius of 500 feet or less, but within a relatively wide signal bandwidth, thereby permitting relatively rapid data transmission.

In addition to the wireless modem 48, the HHU 44 also preferably includes a two-dimensional barcode scanner 50 of a type known in the art. The barcode scanner 50 is operable for scanning a barcode and storing the information that is encoded within the barcode into the memory of the HHU 44. The HHU 44 then displays the encoded information on the touch sensitive screen surface 46.

If desired, the HHU 44 may also incorporate a magnetic stripe reader 47, such as the Mag-Tek Card Reader from Mag-Tek Corporation, 2075 South Annalee, Carson, Calif. 90756, of the type known for reading information encoded in magnetic stripes on driver's licenses and the like and transmitting the information to a computer. This type of magnetic stripe reader is operationally interconnected with the HHU 44 by interfitting a cable connection into a serial input plug on the HHU 44. The magnetic stripe reader 47 is used to input information that is encoded on cards, such as card 49 in FIG. 1, into the internal memory of storage of the HHU 44.

A digital camera 52 is shown in FIG. 1 associated with the vehicle 12. One suitable digital camera for this application is the Kodak series 120 digital camera. The digital camera 52 is capable of capturing images digitally and storing them on a digital storage media within the camera 52. There is also associated with the digital camera 52 a means for transmitting the captured images from the camera 52 to an external destination, such as the memory of the central controller 22. In one embodiment, the digital camera 52 is supplied with a wireless LAN network interface (not shown) similar to that described previously. Such wireless interfaces may be supplied by the manufacturer of the camera 52. When the wireless LAN interface is included, the digital images that are captured by the digital camera 52 can be transmitted to a LAN adapter or other receiver by the wireless LAN interface. This transmission occurs in a relatively continuous fashion when the LAN adapters utilize a TCP/IP stack buffer which ensures sequential storage and retrieval of the data making up the digital images. If a wireless transmission means is unavailable or not desired, digital images captured by the camera 52 can also be transferred from the camera to another storage means via a cable connection such as an RS-232 serial connection (not shown) using well known techniques for the transfer of digital information through such a connection. Alternatively, the digital images may be stored on an intermediate media which is then physically transported from the camera 52 to another storage means. For example, a PCMCIA compatible flash disk can be inserted into the camera 52 for storage of the images thereupon. The flash disk containing the stored images is then be removed from the camera 52 and placed into a slot in a PCMCIA drive disposed in one of a slot 62 within the controller 22. Although this drive is not shown in FIG. 2, the use and operation of them is well known.

Digital images which have been transmitted from the camera 52 to memory or storage can then be accessed from storage for display on the touch screen 19 of the user interface device 18.

Figure 2:
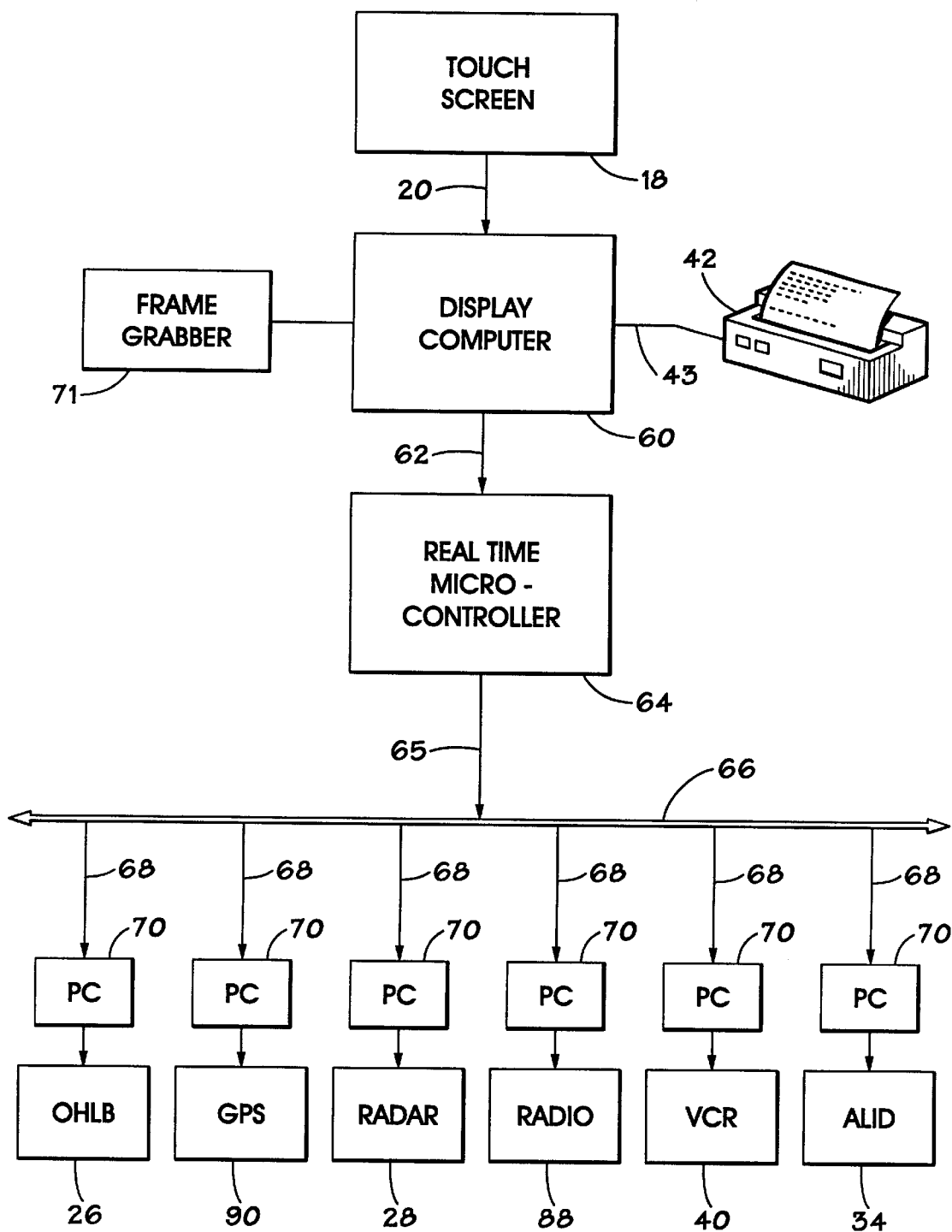
FIG. 2 shows an exemplary block diagram and control hierarchy for the control system shown in FIG. 1.

Referring now to FIG. 2, a block diagram is provided showing the control hierarchy of interconnection and communication between certain components of the exemplary control system 10. The drawing illustrates an exemplary dual controller architecture for accomplishing control of the system components. Power is preferably supplied to components of the system using 12 volt connections from the vehicle battery or an auxiliary source. The control box or housing 22 shown in FIG. 1 may be used to contain many of the components of the control system hereinafter described.

A display computer 60 is used for control and processing of the primary graphical user interface. The display computer 60 is interconnected by interface 62 to a control unit referred to as a real time microcontroller 64. The interface 62 currently comprises a serial RS-232 type connection and uses character protocol to pass commands from the display computer 60 to the real time microcontroller 64. The interface 62 also passes acknowledgements and status information from the real time microcontroller 64 to the display computer 60.

As will be explained in further detail shortly, the display computer 60 comprises the first control unit of two, or perhaps more, control units within the control system 10. The display computer 60 is primarily responsible for the management and control of user interface functions between a user and the control system 10 and, therefore, processes commands from and provides displays and other feedback to the touch screen device 18.

A suitable device for use as the display computer 60 is a Litton Data Systems, Inc. ruggedized, modular on-board computer. Preferably, the display computer 60 is equipped with a suitable graphics card to assist in processing the graphics provided to it by the frame grabber 71 and video cameras 33, 35, 36 and 38.

The real time microcontroller 64 is the second control unit within the control system 10 and is dedicated to control of communications and device command translation. The microcontroller 64 is preferably also enclosed within housing 22. In a presently preferred embodiment, the real time microcontroller 64 comprises a Motorola 68332 microcontroller having a CPU and RAM. At present, 32 k of RAM is preferred. The microcontroller 64 also includes a power supply, clock and support functions as well as serial interfaces for interconnection of the display computer 60 (via serial connection 62) and to the IDB or other data bus 66 (via connection 65). The microcontroller 64 is not required to be associated with a graphics card or otherwise be capable of processing graphics.

The IDB 66 also interconnects to each of the peripheral subsystems via a device connection 68 which includes an interface or protocol converter 70. Presently, it is preferred to use one protocol converter 70 for each controlled subsystem. However, if desired, two or more devices might use a single converter which provides a protocol conversion function along separate individual paths.

A suitable device for use as a protocol converter 70 is a Motorola 68HC12 processor. The protocol converter 70 permits commands to be passed from the display computer 60 and real time microcontroller 64 to peripheral devices, such as the overhead light bar 26, GPS system 90 and radar 28 (see FIG. 2). The protocol converter 70 receives a command or input from the device connection 68 in one protocol, such as SAE J2366. The converter 70 then buffers the command/input, and translates the command into the device protocol that permits the peripheral device to operate in response to the command or input. The specific translation operations needed will necessarily vary by device since the devices are made by different manufacturers who may use differing instruction sets and protocols for their devices.

Figure 3:
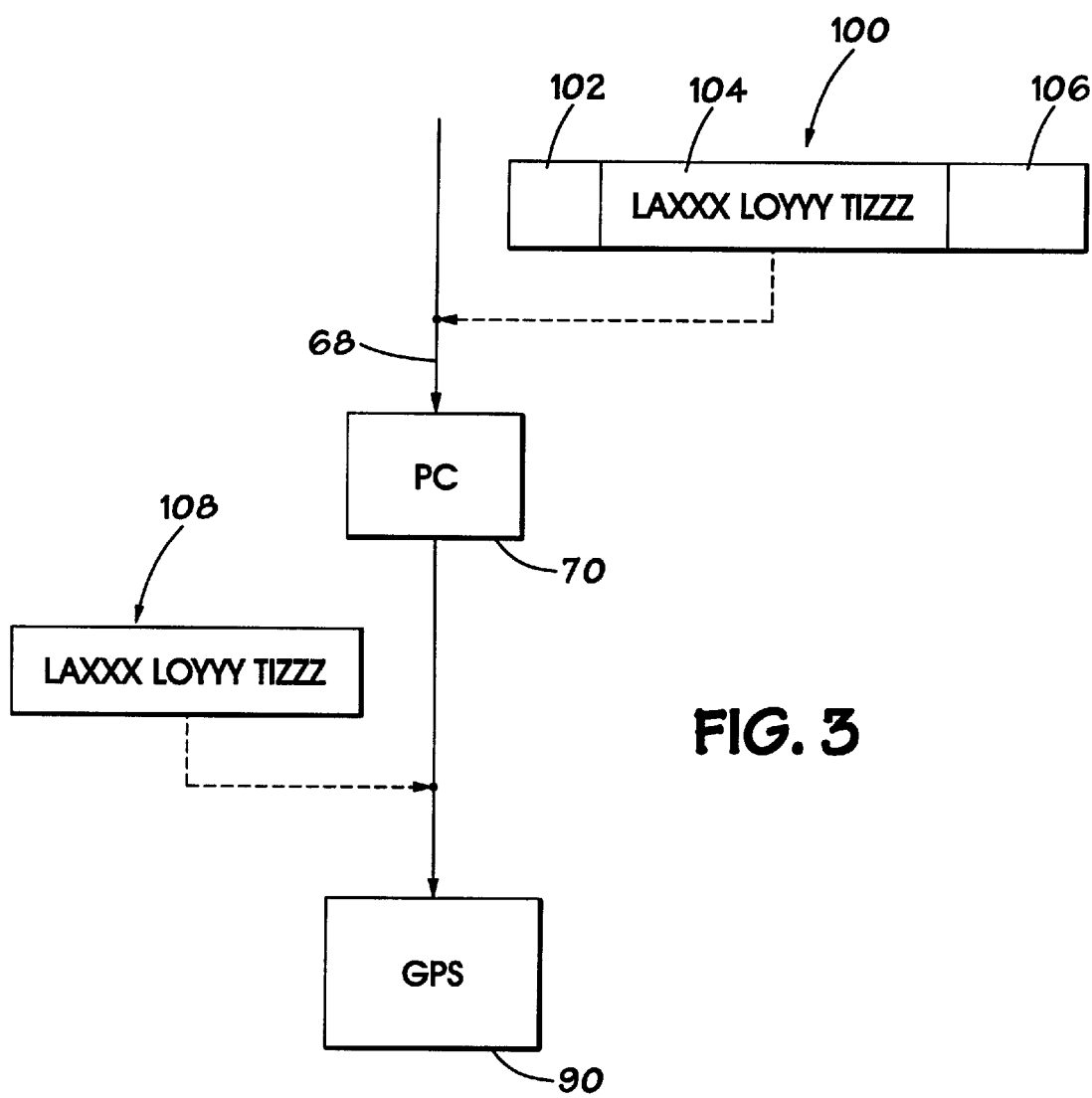
FIG. 3 illustrates the exemplary functioning of a protocol converter.

FIG. 3 illustrates an exemplary translation that might be performed by a protocol converter 70 to pass an information request command through the protocol converter 70 to the GPS system 90. A command message 100 is passed through the device connection 68 to the protocol converter 70. The command message 100 is a request for a GPS position in the form of a string of characters containing a header 102, body 104 and trailer 106. In this instance, the header 102 contains an address corresponding the GPS system 90—the device to which the request is directed. The body 104 contains fields for latitude (LAXXX), longitude (LOYYY) and time (TIZZZ). The trailer 106 contains error detection information.

The protocol converter 70 receives the command message 100 and translates it into a useable output message 108 by removing the header 102 and trailer 106 information. The output message 108 now consists of the body of the message 100 which is then transmitted to the GPS system 90 according to the protocol usable for that device. There may be additional formatting requirements according to the requirements of the particular peripheral device being communicated with. For example, the command message may need to be converted from alphanumeric characters to octal or hexadecimal characters. Such translation operations are understood by those of skill in the art. Compatibility between the control units 60, 64 and the peripheral devices can be assured by using instruction sets provided with a component or available from its manufacturer.

Those skilled in the art will recognize that there are numerous ways in which the devices could be programmed in a customized manner by a user to control peripheral subsystems and devices. In addition, detailed control logic descriptions, flow charts, and even source code are available from the manufacturers and retailers of various peripheral components which might be used, with proper permission or license.

The GPS subsystem 90 can likewise communicate with the display computer 60 and real time microcontroller 64 by sending information back through the protocol controller 70 wherein the translation operations essentially occur in reverse.

In operation, commands entered into the touch screen 18 are sent to the display computer 60 via connection 20. The display computer 60 formats the command into a message and parses the message for transmission to the proper peripherals. The display computer 60 then transmits the parsed messages to the real time microcontroller 64 which performs any protocol conversion or interfacing necessary for the messages to be passed from the microcontroller 64 to the multidrop IDB 66. The real time microcontroller 64 converts the messages it receives into data packets and transmits the data packets as command messages along to the IDB 66 according to the IDB's token passing timing requirements.

In operation, the real time microcontroller 64 receives commands from the display computer 60 via the interface 62 and, thus, controls the functions of interconnected controlled components, including the ALID 34, VCR 40, camera assembly 30, overhead light assembly 26, and radar 28. Other controlled components include the radio 88, GPS subsystem 90 and video multiplexer 92 which is used to control views from the various cameras of the camera assembly 30 and the night vision camera arrangement 32.

The display computer 60 operates using a communications manager program to handle communications to and from the HHU 44 or other remote source.

The control system 10 is made more efficient through the offloading of device control functions, including protocol conversion from the display computer 60. The real time microcontroller 64 eliminates the need for the display computer 60 to have to perform protocol conversion and convert messages into data packets suitable for transmission to and handling by the IDB 66. The real time controller 64 also inserts error detection information for use in the trailer 106 of command messages, such as command message 100. The real time controller 64 can also be programmed to perform system and network diagnostics thus also offloading these functions from the display computer 60.

Because device control functions for the peripherals are managed primarily by the real time microcontroller 64, these device control functions are not slowed down by the processing time required to process the graphical user interface functions associated with the touch screen 18 and frame grabber 71. Conversely, the user interface functions, being managed exclusively by the display computer 60, are not slowed down by the processing time required to process the control functions for the ALID 34, radar 28 and so forth. The touch screen 18 and frame grabber 71 may be thought of as a first device set, the control functions for which are managed by the first of two control units, the display computer 60. The peripheral controlled devices may be thought of as a second device set. The control functions for the second device set are managed by the real time microcontroller 64.

The multiple processor scheme is not limited to the use of two control units such as 60 and 64. There may be additional control units which are interconnected to one another in serial if necessary or desired to support a large number of peripheral devices or subsystems.

It is further pointed out that the control system 10 of the present invention is modular in design so that additional peripheral components may be added or substituted as subsystems and then be controlled centrally. Prior devices relied upon the use of serial controller cards to provide an operable connection between the controller and the controlled peripheral device. The controller card provided a number of serial ports. As a result, the number of peripherals that could be controlled by the system was constrained by the number of available serial ports. An additional controller card could be added to the system that would essentially double the number of available ports. However, the boards are somewhat costly and the addition of one of them will substantially increase the overall cost of the control system.

The devices and systems described herein are extremely advantageous in that they reduce the need for physically large components, such as serial controller boards. The components used for interface with the IDB 66 are quite small and will take up much less space within the trunk 16 of the vehicle 12. The reduction in component size could also permit the elements of the control system 10 to be placed elsewhere within the vehicle 12. The reduced component size also causes the control system 10 to consume less power than systems which used controller boards.

The touch screen type user interface device 18 serves a dual purpose. First, it displays information to the operator. Second, it permits the operator to enter input commands for operation of all the various subsystems associated with the vehicle 12 through the selective provision of device control commands. As described in greater detail in related patent application Ser. No. 912,676, the user interface permits hierarchical menu structure interface for selection of one from among several individual controlled subsystems, and for providing device control commands to the selected subsystem. As described in U.S. patent application Ser. No. 912,676, a user may essentially move through a hierarchical menu structure which is provided by the screens by making selections presented on the screens. The user interface also features shortcut commands which are capable of providing device commands to a plurality of controlled subsystems relatively simultaneously.

Figure 4:
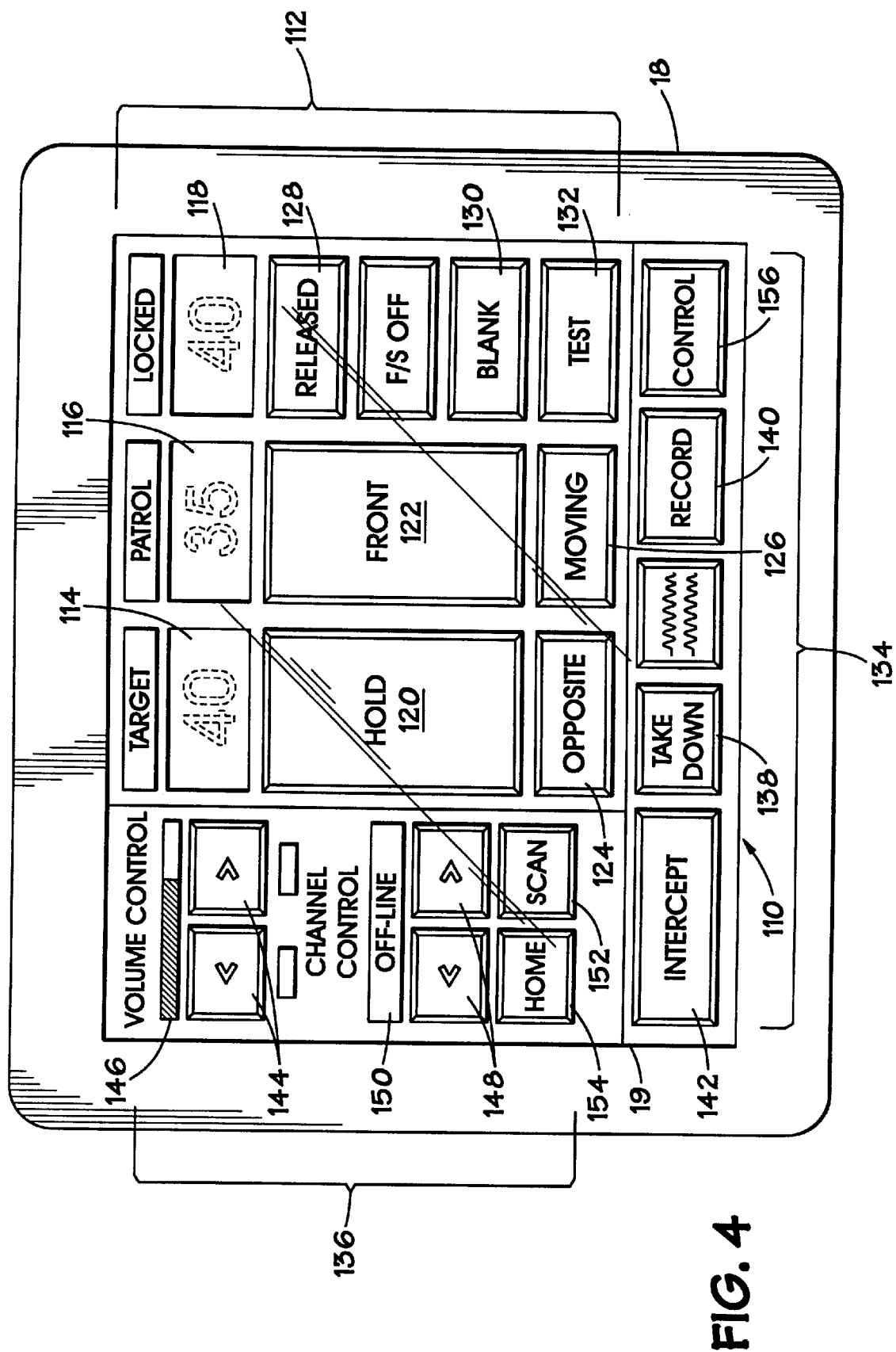
FIGS. 4 and 5 illustrate exemplary touch screen displays used with the present invention.
Figure 5:
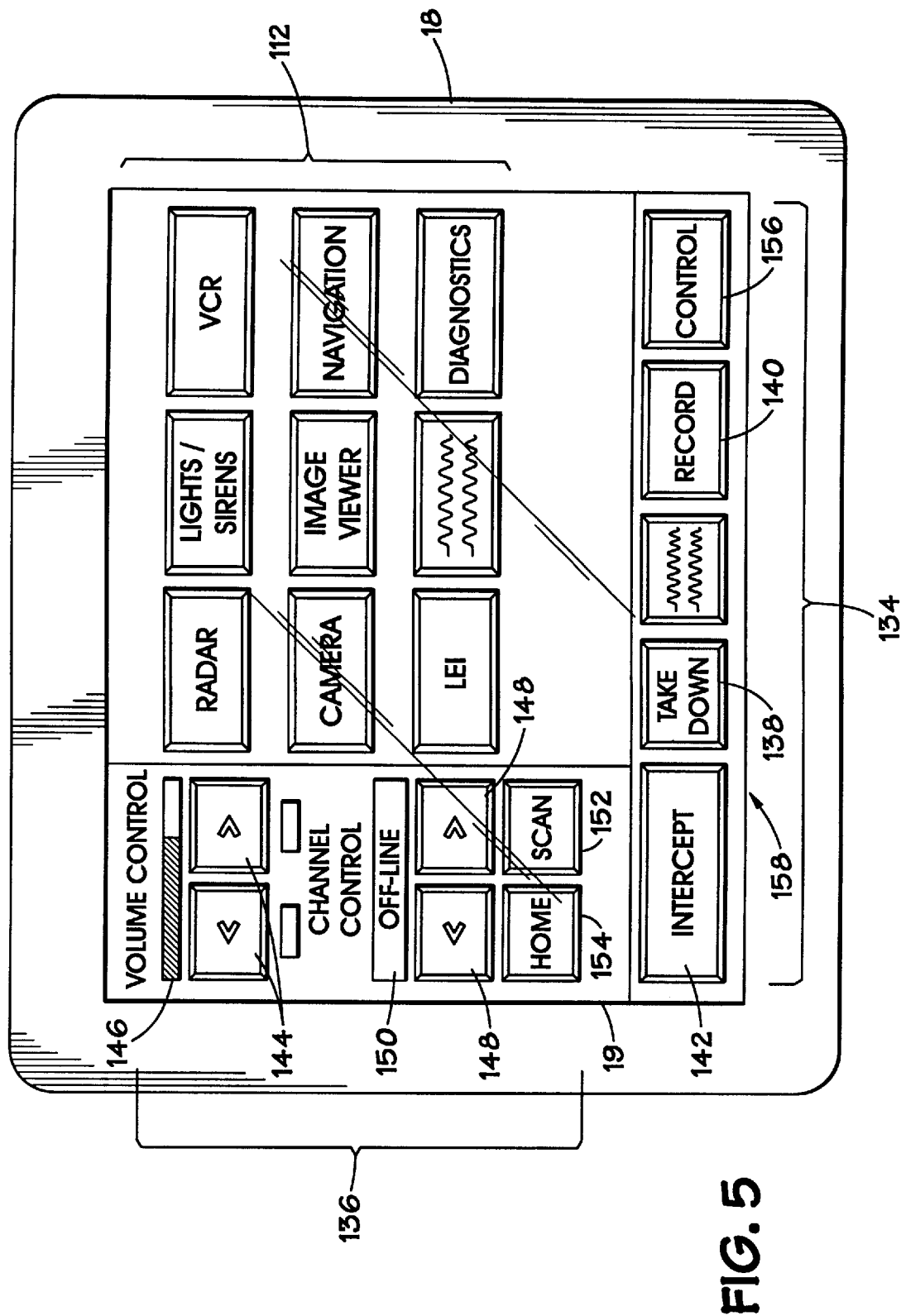

Several screen displays, and the use thereof, are depicted and described in application Ser. No. 912,676. FIGS. 4 and 5, however, depict additional exemplary screen displays to aid in description of currently preferred methods for controlling associated peripheral devices using the touch screen 19 of the user interface device 18. These methods permit detailed adjustment and control of multiple devices from a single screen. The screens include fixed control and display portions that allow certain devices and functions to be accessed continuously. Among the fixed control and display portions are "speed buttons" 134 that function as short cuts for the control of other peripherals which are not capable of being controlled via the device control portions of the screen at that time. The speed buttons allow the activation of preselected functions for such peripherals.

The screens described also include individual device control portions that can be filled with control displays for individual devices or combinations of devices. The individual device control portions permit detailed control and adjustment of those individual devices or device combinations.

Referring to FIG. 4, an exemplary "radar" control screen display 110 is depicted. The screen display 110 contains a device control portion 112 which provides a graphical user interface for control of a selected device. The radar control screen display 110 is used primarily for control of the radar system peripheral 28. As a result, the device control portion 112 for it contains controls and displays associated with operation of the radar 28. Included is a target speed display window 114, patrol car speed display window 116 and a locked speed window 118. A toggle button 120 permits the settings for the radar 28 to be toggled between a "HOLD" and a "TRANSMIT" mode, thereby specifying whether the radar 28 readings will be broadcasted from the vehicle 12. Toggle button 122 allows the direction of the radar 28 to be toggled between "FRONT" and "REAR" directions with respect the police vehicle 12. Toggle button 124 causes the direction of the target traffic to be identified as the "SAME" or "OPPOSITE" that of the direction of the police vehicle 12. Toggle button 126 is used to specify whether the police vehicle 12 is "MOVING" or "STATIONARY." To lock or release a target vehicle's speed on the display, the "LOCK"

and "RELEASE" toggle 128 is used. The "BLANK" button 130 is used to reset the speeds, and the "TEST" button 132 is used to test the radar 28. It will be understood that the precise controls and displays to be used can vary in accordance with the features and operation of the particular radar system used, its make and model, and the instructions and operations supported by its manufacturer.

However, the screen 110 also includes two fixed control and display portions 134, 136. These portions will be present even though the particular device control portion 112 of the screen is changed. Fixed portion 134 includes a number of "speed buttons." Two such speed buttons 138, 140 are described here, although it will be understood that there may be additional buttons of this type. The "TAKE DOWN" speed button 138 activates the overhead light bar 26 to cause it to operate in a "take down" mode. The "RECORD" speed button 140 causes the VCR 40 to begin recording images from the primary camera. The "INTERCEPT" speed button 142 is a short cut button for activation of selected peripherals in an intercept mode, i.e., activation of siren and lights.

Fixed control and display portion 136 allows control of the radio system peripheral 88 despite changes to the selectable display 112 on the touch panel since it is important that a police officer have constant access to the radio system 88. The radio control 136 includes volume control buttons 144 and a volume display 146. Also included are channel control buttons 148 and a channel display 150. A "SCAN" button 152 causes the radio 88 to scan available frequencies for channels while the "HOME" button 154 causes the radio 88 to return to a preselected home frequency.

The control button 156 at the bottom right portion of the screen 110 may be touched to move to a control screen from which access to other device screens may be had. FIG. 5 depicts an exemplary control screen 158 in which the fixed control and display portions 134, 136 remain unchanged as compared to radar control screen 110. The device control portion 112, however, is changed so that a menu is displayed that allows a choice of different devices to be chosen for control on the device control portion 112.

The present invention has been described with respect to specific embodiments thereof, but is not so limited. Those of skill in the art will understand that many other various changes and modifications may be made while remaining within the scope and spirit of the invention.

What is claimed is:

1. An emergency response system for providing coordinated operation among sets of vehicular-based peripheral devices, the system comprising:

a first device set for providing user interface with the emergency response system;

a first control unit being operably connected for operation of the first device set;

a second device set comprising at least one vehicle-based peripheral device; and a second control unit being operably connected for operation of the second device set.

2. The system of claim 1 further comprising an interface for operably associating at least one of the control units with a data bus.

3. The system of claim 1 further comprises an interconnection between the first and second control units to provide communication between the first and second control units.

4. The system of claim 3 wherein the communication provided between the first and second control units comprises transmitting commands, acknowledgements and status information.

5. The system of claim 1 wherein the first device set comprises a touch screen interface device.

6. The system of claim 1 wherein the second device set comprises a night vision camera arrangement.

7. The system of claim 1 wherein the second device set comprises a license plate reader.

8. The system of claim 1 wherein the first control unit comprises a programmable digital computer.

9. The system of claim 1 wherein the second control unit comprises a programmable digital computer.

10. A system for controlling a plurality of vehicular-based peripheral subsystems, comprising:

a. a first control unit which receives a control command from a user and communicates said control command to a second control unit, said first control unit comprising a programmable digital computer; and b. a second control unit also comprising a programmable digital computer and being in communication with said first control unit which receives messages from said first control unit and, in response thereto, selectively controls the functions of at least one vehicular-based peripheral subsystem.

11. The control system of claim 10 further comprising a vehicle bus interface disposed between the control units and the peripheral subsystem.

12. The control system of claim 10 further comprising a protocol converter interface between a control unit and the peripheral subsystem.

13. The control system of claim 10 further comprising a touch screen user interface device.

14. The control system of claim 13 wherein the touch screen user interface provides an individual device control portion.

15. The control system of claim 13 wherein the touch screen user interface provides a fixed control and display portion.

16. The control system of claim 15 wherein the fixed control and display portion comprises a speed button for providing a shortcut key.

17. A method of controlling peripheral devices via a touch screen interface, comprising:

a) inputting a control command into the touch screen;

b) transmitting the control command to a first control unit;

c) parsing the control command;

d) transmitting the parsed control command to a second control unit;

e) transmitting the parsed control command to a peripheral device to be controlled.

18. The method of claim 17 further comprising the operation of converting the protocol of the control command.

* * * * *